Figure 1:
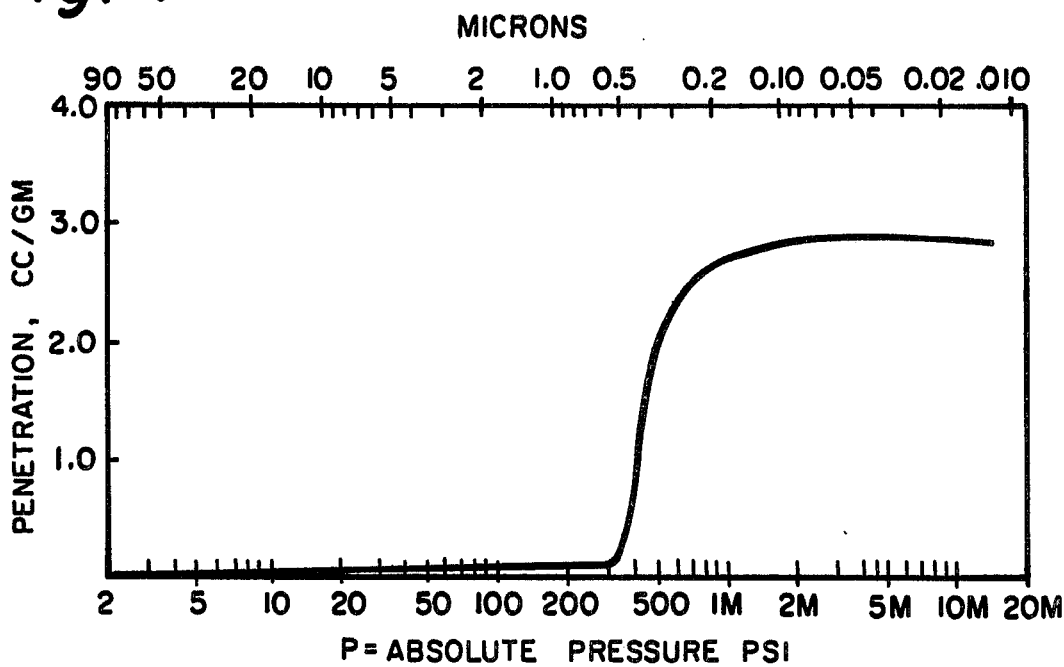

United States Patent [19]

Blaszyk et al.

[11] 4,112,032

[45] Sep. 5, 1978

[54] SILICA-CONTAINING POROUS BODIES OF CONTROLLED PORE SIZE

[75] Inventors: Paul E. Blaszyk, Horseheads; Robert D. Shoup; William J. Wein, both of Corning, all of N.Y.

[73] Assignee: Corning Glass Works, Corning, N.Y.

[21] Appl. No.: 859,326

[22] Filed: Dec. 12, 1977

Related U.S. Application Data

[63] Continuation-in-part of Ser. No. 678,928, Apr. 21, 1976, abandoned, which is a continuation of Ser. No. 440,693, Feb. 8, 1974, abandoned.

[51] Int. Cl.² .................................................. C04B 35/14
[52] U.S. Cl. .......................................... 264/42; 264/44; 264/45.3
[58] Field of Search ............................ 264/42, 45.3, 44

Primary Examiner—Robert F. White
Assistant Examiner—John A. Parrish
Attorney, Agent, or Firm—Clinton S. Janes, Jr.; Clarence R. Patty, Jr.

[57] ABSTRACT

This invention relates to the preparation of silica-containing particulate materials and monolithic structures exhibiting high porosity with exceptionally uniform pore size. The bodies are produced through gelation of aqueous alkali metal silicate and/or colloidal silica solutions, optionally contaiing dispersed particulate phases, with organic reagents followed by a leaching step. Uniformity of pore size is achieved through careful control of such variables as the ratio of alkali metal silicate to colloidal silica solutions, the concentration of silica, the amount of dispersed phase employed, and the like.

8 Claims, 7 Drawing Figures

SILICA-CONTAINING POROUS BODIES OF CONTROLLED PORE SIZE

This application is a continuation-in-part of application Ser. No. 678,928, filed Apr. 21, 1976, abandoned which was a continuation of application Ser. No. 440,693, filed Feb. 8, 1974 and now abandoned.

United States Pat. No. 3,678,144, discloses the preparation of porous and non-porous silica-containing bodies containing certain metal oxides which, because of the method of preparation, are inextricably bound within the silica network. That patent describes preparing an aqueous solution having a pH between 10–15 and containing about 1–12 moles $SiO_2$ per liter in solution from such aqueous silicate solutions as alkali metal silicates, quaternary ammonium silicate, colloidal silica, and mixtures thereof. Thereafter, a metal oxide is added to that solution in a form such that it can be dissolved therein and will not reduce the pH thereof below 10. An organic reagent selected from the group formaldehyde, paraformaldehyde, glyoxal, methyl formate, methyl acetate, ethyl formate, ethyl acetate, and mixtures thereof is admixed therewith to cause polymerization of the silica to a coherent, porous body, the metal oxide becoming part of the silica network. Where desired, free alkali metal oxide can be removed from the body through leaching in weak acids. A further embodiment of that invention contemplates firing the porous bodies to a sufficiently high temperature to cause consolidation to solid glass article.

Although porous bodies were obtained through the preparative technique described in that patent, the size of the pores throughout the bodies was quite non-uniform. This characteristic severely circumscribed the utility thereof. Hence, for example, a porous silicate body having very closely controlled, small-sized pores would be eminently suitable for such applications as catalyst supports for air pollution control, filtration devices for gases and/or liquids, acoustical materials, and chromatographic supports.

Therefore, the principal objective of the instant invention is to prepare porous particulate and monolithic silica-containing materials having a broad spectrum of pore ranges with narrow distribution within each range.

This objective can be achieved through what is, in essence, an improvement upon the invention disclosed in U.S. Pat. No. 3,678,144 above. Thus, porous silica-containing particulate materials and monolithic structures can be made utilizing the siliceous ingredients and the basic method described in that patent but wherein, through the careful control of precursor composition and the relationship between precursor composition and gelation agent, pore size distributions wherein at least 80% of the pores are no greater than ±30% and, commonly, less than ±10% from the average diameter can be secured in pores ranging between about 100Å to 1 micron (10,000Å) in diameter.

The present invention is founded upon the discovery that porous, durable, strong silica-containing bodies of uniform pore size can be produced from specifically-defined compositional combinations of alkali metal silicate, quaternary ammonium silicate, lithium polysilicate and colloidal silica with the organic gelation agents formaldehyde, paraformaldehyde, formamide, glyoxal, methyl formate, methyl acetate, ethyl formate, and ethyl acetate. Thus, whereas porous bodies can be secured through the reaction of one of the silica-containing starting ingredients recited above with the organic gelation agent, a broad spectrum of pore sizes cannot be obtained. It is only when the following specified combinations of materials are employed, and in the quantities set out, that fine pores of varying size and uniform distributions will be developed.

The closest control of pore size can be achieved with bodies utilizing a precursor mixture of potassium silicate and colloidal silica. Varying the ratio of potassium silicate to colloidal silica in precursor solutions permits the formation of porous silica bodies with variable, but controllable, pore dimensions. Where potassium silicate is reacted alone with a gelation agent, relatively large pores are formed with little control of the pore diameter within the body. Thus, depending upon the concentrations of potassium silicate in the aqueous solution, the average pore diameter may vary from as low as about 2000Å to as large as several microns with variances from the average of 100% and more being not uncommon. Conversely, where colloidal silica is polymerized alone with a gelation agent, relatively small pores result, e.g., averaging about 100Å and even less. Deviations from the average pore diameter are not quite so great as in the bodies prepared from potassium silicate alone, normally no more than about 50% although variations up to 100% have been observed. However, bodies formed solely from colloidal silica alone reacted with a gelation agent have proven to be so mechanically weak as to be essentially impractical for service applications. Experience has dictated that the final porous body ought to have a compressive strength of at least 50 psi to be practically useful. It can be appreciated, of course, that the admixture of fillers or other reinforcing means to form a composite article may permit the use of a base body of lesser strength than when the body is to be used alone in the unmixed or pristine state.

Any aqueous potassium silicate solution and colloidal silica solution can be utilized in the invention which contain about 1–12 moles $SiO_2$/liter in solution. Nevertheless, in the interest of economy, commercially-available solutions were employed having the compositions listed below in weight percent:

Potassium silicate — 8.3% $K_2O$, 20.8% $SiO_2$, Balance $H_2O$

Colloidal Silica — 40% $SiO_2$, balance $H_2O$

Table I reports a group of compositions prepared with the above aqueous, silica-containing solutions. Where mixtures of the solutions are recorded, the potassium silicate was added slowly with stirring to the colloidal silica in a plastic container to achieve a homogeneous solution. Reagent grade formamide in amounts of about 7 – 15 grams was added to the silicate solution with stirring to remove any gelled particles that might form. Both of the cited mixing operations were undertaken at room temperature as a convenience although any temperature ranging between the freezing point and the boiling point of the solution is mechanically feasible. This precursor solution was allowed to gel in the plastic container at slightly elevated temperatures but below 100° C. to a coherent porous body. Gelation can be accomplished at temperatures between the freezing point and boiling point of the solutions but the rate is more rapid as the temperature is increased. Therefore, gelation at room temperature or at temperatures between about 70° – 90° C. is commonly practiced with times varying between about 10 minutes to one hour. The gelled product assumed the shape of the plastic container with a linear shrinkage of about 5 – 25%. The resultant porous gel structure was leached at room temperature in such weakly acid solutions as tap water, a solution of 1–5% 1N $HNO_3$ + 95–99% alcohol, or an aqueous 1M $NH_4NO_3$ solution to remove residual $K_2O$ and produce a porous 99+% silica body. The aqueous 1M $NH_4NO_3$ solution is the preferred leachant. Slightly elevated temperatures can be employed to expedite the leaching, if desired.

In the following examples, the determination of pore size and pore size distribution was conducted utilizing an Aminco Motor Driven Digital Readout Porosimeter, Model No. 5-7121B, marketed by American Instrument Company, Division of Travenol Laboratories, Inc., Silver Spring, Md. This apparatus utilizes the mercury intrusion technique, the operating mechanism of which has been discussed in such publications as "An Instrument for the Measurement of Pore-Size Distribution by Mercury Penetration", N. M. Winslow and J. J. Shapiro, ASTM, Bulletin No. 236, pages 39–44, February, 1959, and "Modifications in Mercury Porosimetry", L. K. Trevel and L. J. Kressley, Analytical Chemistry, 35, pages 1492–1502, September, 1963. Another commercially-available apparatus also employing the mercury intrusion technique for measuring pore size and distribution is marketed by Micromeritics Instrument Corporation, Norcross, Georgia.

TABLE I

| Example No. | Composition | Body Strength | Average Pore Diameter |
|---|---|---|---|
| 1 | 100 grams colloidal $SiO_2$ | very weak | 80–100A |
| 2 | 80 grams colloidal $SiO_2$ 20 grams potassium silicate | minimally satisfactory | 200A |
| 3 | 60 grams colloidal $SiO_2$ 40 grams potassium silicate | moderate | 300A |
| 4 | 40 grams colloidal $SiO_2$ 60 grams potassium silicate | moderately strong | 500A |
| 5 | 20 grams colloidal $SiO_2$ 80 grams potassium silicate | strong | 1200A |
| 6 | 10 grams colloidal $SiO_2$ 90 grams potassium silicate | strong | 1800A |
| 7 | 100 grams potassium silicate | very strong | 3000A |

In the above samples, the body strengths reflect qualitative measurements of compressive strengths, 50 psi representing what is deemed to be a practical minimum strength. Measurements of pore size were conducted following conventional porosimetry techniques utilizing mercury intrusion.

As can be observed from the table, the ability to secure porous articles with varying pore diameters and exhibiting pore size distributions, wherein at least 80% of the pores fall within ±30% of the average pore diameter and, commonly, ±10%, while displaying adequate mechanical strength for practical utility, is dependent upon the relative amounts of colloidal silica and potassium silicate in the solution mixture. Hence, with respect to the starting materials used in the examples recorded in Table I, the ratio, by weight, of the potassium silicate solution to the colloidal silica can range from about 19:1 to 1:4. Thus, at least about 20% potassium silicate solution is necessary to impart the desired mechanical strength and at least about 5% colloidal silica is required to affect pore diameter.

It can be appreciated that colloidal silica and potassium silicate solutions having concentrations of $K_2O$ and $SiO_2$ differing from those present in the above-cited materials will be operable in the invention, when employed in such amounts as to produce $K_2O$ and $SiO_2$ contents equivalent to those provided by the latter materials.

In contrast to the relatively broad range of colloidal silica-potassium silicate combinations operable in yielding porous $SiO_2$-containing articles of controlled pore distribution, the field of effectiveness of mixtures of sodium silicate and colloidal silica is severely limited. Table II reports sample compositions bearing out that fact.

The principal problem involved concerns the incompatibility of colloidal silica with sodium silicate in mixtures containing those two materials. Thus, where a commercially-available aqueous sodium silicate solution consisting, by weight, of 6.8% $Na_2O$, 25.3% $SiO_2$, and the balance $H_2O$ was blended with the colloidal silica used above in the examples of Table I, homogeneous solutions could not be achieved in mixtures containing more than about 35% by weight of the sodium silicate solution until an essentially 100% sodium silicate solution was employed. Bodies formed from the latter mixtures did not demonstrate the desired control of pore dimensions.

Even at the 35% level of sodium silicate solution, a homogeneous mixture with colloidal silica could only be achieved by diluting the sodium silicate solution with an equal amount of water and then adding it dropwise into highly agitated colloidal silica. When the sodium silicate was utilized at full strength, only a 20% level could be employed even with dropwise additions. Therefore, weight ratios of sodium silicate to colloidal silica of about 1:9–1:3 have been deemed operable. Reagent grade formamide again comprised the gelation reagent and, inasmuch as gelation proceeded rapidly, it was admixed with the colloidal silica prior to the addition of the sodium silicate solution. The same process parameters of time and temperature useful with the mixtures set out in Table I with respect to gelation and leaching are likewise useful here.

TABLE II

| Example No. | Composition | Solution Appearance | Body Strength | Average Pore Diameter |
|---|---|---|---|---|
| 8 | 80 grams colloidal $SiO_2$ 20 grams sodium silicate | homogeneous | moderate | 150A |
| 9 | 65 grams colloidal $SiO_2$ 35 grams sodium silicate (diluted 100% with $H_2O$) | relatively homogeneous | minimally satisfactory | 200A |
| 10 | 40 grams colloidal $SiO_2$ 60 grams sodium silicate | slurry | not coherent | — |
| 11 | 20 grams colloidal $SiO_2$ 80 grams sodium silicate | slurry | very weak | 5000A–1.7 micron |
| 12 | 10 grams colloidal $SiO_2$ 90 grams sodium silicate | slurry | moderate | 3500A–5200A |
| 13 | 100 grams sodium silicate | homogeneous | strong | 3000A–4500A |

Examples 10, 11, and 12 demonstrate the instability of colloidal silica in mixtures of higher sodium silicate contents. This practice leads to precipitation or gelation of the system and the formation of slurries which were permitted to set up or gel to whatever degree possible in the presence of formamide. The resulting bodies were weak, the strength decreasing as the level of colloidal silica increased. The average diameter of the pores contained within those bodies gelled from the heterogeneous slurries increased as the percentage of colloidal silica in the mixture increased. This phenomenon is to be expected since, in reality, one is increasing the amount of dispersed (filler) material in a gel-like body. However, that situation is in direct contrast to the observation made concerning mixtures of colloidal silica and potassium silicate as reported in Table I. Thus, the colloidal silica-potassium silicate mixtures provide at least three distinct advantages over colloidal silica-sodium silicate mixtures.

First, homogeneous solutions can be achieved over a wide composition range.

Second, relatively strong, uniform gel structures can be attained over that wide composition range.

Third, controlled pore gel structures can be produced over that wide composition range with average pore diameters varying between about 100Å to 1 micron, depending upon the ratio of colloidal silica to potassium silicate, with at least 80% of the pores falling within ±30% and, commonly, within ±10% of the average pore diameter value.

This greater compatibility or stability of colloidal silica in potassium silicate solutions than in sodium silicate solution can be explained on the basis of the difference in effective size and charge density of the two hydrated alkali ions. Thus, if it be assumed that when these ions are in a water solution they are surrounded by water molecules (water of hydration), then the smaller size and higher charge density of the $Na^+$ ion allow it to neutralize the negative surface charge which stabilizes colloidal silica particles and thereby causes agglomeration and precipitation of the silica. As opposed to this, the lower charge density of the hydrated $K^+$ ion is more effectively shielded by its hydration sphere such that neutralization of that charge is prevented.

The validity of that explanation was supported in the observation that the dropwise addition of a NaOH solution (10 grams NaOH in 100 grams $H_2O$) to the above-cited colloidal silica solution caused precipitation of the silica sol, whereas the addition of a KOH solution of equal concentration to a like sample of colloidal silica resulted in a homogeneous solution.

A quaternary ammonium silicate solution is commercially available which consists, by weight, of about 9.9% quaternary ammonium ions, 45% $SiO_2$ and the balance $H_2O$. Patent No. 3,678,144 above indicated that a porous body could be secured therefrom through gelation with the recited reagents. However, little control over pore diameter could be maintained, the average diameter of the pores being less than about 200Å.

Table III reports several examples of bodies formed through the gelation of mixtures utilizing the sodium silicate, potassium silicate, and quaternary ammonium silicate solutions noted above. Reagent grade formamide in an amount of 10 grams/100 grams of alkali silicate comprised the gelation agent. The parameters of mixing, gelling, and leaching discussed with respect to the examples of Table I are equally applicable with the present compositions. Room temperature was employed in each gelation of the following examples. Homogeneous solutions were secured from all mixtures of the starting ingredients.

TABLE III

| Example No. | Composition | Body Strength | Average Pore Diameter |
|---|---|---|---|
| 14 | 100% quat. amm. silicate | weak | <200A |
| 15 | 90% quat. amm. silicate 10% sodium silicate | weak | <200A |
| 16 | 80% quat. amm. silicate 20% sodium silicate | moderate | <200A |
| 17 | 60% quat. amm. silicate 40% sodium silicate | moderate | 320A |
| 18 | 40% quat. amm. silicate 60% sodium silicate | strong | 1500A |
| 19 | 30% quat. amm. silicate 70% sodium silicate | strong | 1700A |
| 20 | 20% quat. amm. silicate 80% sodium silicate | strong | 2900A |
| 21 | 10% quat. amm. silicate 90% sodium silicate | strong | 3500A |
| 22 | 90% quat. amm. silicate 10% potassium silicate | weak | <200A |
| 23 | 80% quat. amm. silicate 20% potassium silicate | moderate | <200A |
| 24 | 60% quat. amm. silicate 40% potassium silicate | moderate | 220A |
| 25 | 40% quat. amm. silicate 60% potassium silicate | strong | 1000A |
| 26 | 30% quat. amm. silicate 70% potassium silicate | strong | 1600A |
| 27 | 20% quat. amm. silicate 80% potassium silicate | strong | 2800A |
| 28 | 10% quat. amm. silicate 90% potassium silicate | strong | 4800A |

It is of interest to note that, in contrast to colloidal silica, complete solution in all proportions is possible between quaternary ammonium silicate and both sodium silicate and potassium silicate. To insure good control of average pore diameter, however, the ratio of quaternary ammonium silicate to alkali silicate should be held between about 4:1 to 1:19.

U.S. Pat. No. 3,678,144 had indicated that lithium polysilicate could be gelled to a porous, monolithic structure employing the cited organic reagents. However, when a commercially-available lithium polysilicate consisting, by weight, of 2.1% $Li_2O$, 20% $SiO_2$, and the balance $H_2O$ was gelled with formamide, the pores developed therein were generally very small with essentially no pore size control. Table IV records a number of examples involving mixtures of lithium polysilicate with sodium silicate, potassium silicate, colloidal silica, and quaternary ammonium silicate undertaken to produce bodies of uniform pore size. In each instance, reagent grade formamide in an amount of 10% by weight of the mixture constituted the gelation agent. The mixing, gelation, and leaching in all cases were conducted at room temperature although it will be recognized that the parameters therefor expressly cited for the examples of Table I would likewise be operable here. Homogeneous solutions were obtained from all mixtures of the starting materials.

TABLE IV

| Example No. | Composition | Body Strength | Average Pore Diameter |
|---|---|---|---|
| 29 | 100% lithium polysilicate | weak | <200A |
| 30 | 20% lithium polysilicate 80% sodium silicate | strong | 3200A |
| 31 | 30% lithium polysilicate 70% sodium silicate | strong | 2900A |
| 32 | 40% lithium polysilicate 60% sodium silicate | moderate | 2400A |
| 33 | 20% lithium polysilicate 80% potassium silicate | strong | 4000A |
| 34 | 30% lithium polysilicate 70% potassium silicate | strong | 2300A |
| 35 | 40% lithium polysilicate 60% potassium silicate | moderate | 1700A |
| 36 | 50% lithium polysilicate 50% quat. amm. silicate | weak | <200A |
| 37 | 70% lithium polysilicate 30% colloidal silica | weak | <200A |

Table IV indicates that porous articles with varying pore diameters and exhibiting very fine pore size distribution with reasonable strength can be secured in mixtures of lithium polysilicate with the sodium silicate and potassium silicate over the range of lithium polysilicate to alkali metal silicate of about 4:1 to 1:19. However, bodies formed from the gelation of lithium polysilicate with quaternary ammonium silicate and/or colloidal silica are weak and provide essentially no pore size control.

EXAMPLE 38

A homogeneous mixture of 30 grams of colloidal silica and 70 grams of quaternary ammonium silicate was placed in a plastic container and 10 grams of reagent grade formamide stirred therein. After gelling for one hour, the body was removed from the container and leached in the weakly acidic aqueous 1M $NH_4NO_3$ solution described above. All operations were conducted at room temperature. A porous article having minimally satisfactory strength was obtained wherein the size of the pores varied between about 120Å–2000Å, averaging about 200Å.

In light of the foregoing examples, several conclusions become apparent:

First, controlled pore silica bodies, i.e., articles wherein at least 80% of the pores fall within ±30% and, preferably, ±10% of the average pore diameter can be prepared from a rather broad range of mixtures of aqueous potassium silicate and colloidal silica solutions.

Second, controlled pore silica bodies can be prepared from a very narrow range of mixtures of aqueous sodium silicate and colloidal silica solutions.

Third, controlled pore silica bodies can be prepared from a broad range of mixtures of aqueous quaternary ammonium silicate and sodium silicate and/or potassium silicate solutions.

Fourth, controlled pore silica bodies can be prepared from a broad range of mixtures of aqueous lithium polysilicate and sodium silicate and/or potassium silicate solutions.

Fifth, controlled pore silica bodies of reasonable strength cannot be prepared from mixtures of aqueous quaternary ammonium silicate and colloidal silica solutions.

Sixth, controlled pore silica bodies of reasonable strength cannot be prepared from mixtures of aqueous lithium polysilicate and quaternary ammonium silicate and/or colloidal silica solutions.

Table V reflects the effect of dilution by water upon pore size control. In the examples recited therein, the colloidal silica was added slowly with stirring into the potassium silicate solution. The diluent water was then added thereto. Reagent grade formamide in an amount of 7–15 grams was slowly poured into the diluted solution with stirring. After gelling for about one hour, the body was removed from the plastic container and immersed in the above-described aqueous 1M $NH_4NO_3$ solution to leach out the excess alkali. Each of the above steps was undertaken at room temperature for convenience.

TABLE V

| Ex. No. | Composition | $H_2O$ Dilution | Body Strength | Average Pore Size |
|---|---|---|---|---|
| 39 | 30 grams colloidal $SiO_2$ 70 grams potassium silicate | 0 | strong | 900A |
| 40 | 30 grams colloidal $SiO_2$ 70 grams potassium silicate | 30 grams | moderate | 440A |
| 41 | 30 grams colloidal $SiO_2$ 70 grams potassium silicate | 50 grams | minimally adequate | 300A |
| 42 | 30 grams colloidal $SiO_2$ 70 grams potassium silicate | 100 grams | weak | 220A |
| 43 | 50 grams colloidal $SiO_2$ 50 grams potassium silicate | 0 | moderately strong | 250A |
| 44 | 50 grams colloidal $SiO_2$ 50 grams potassium silicate | 30 grams | minimally adequate | 220A |
| 45 | 50 grams colloidal $SiO_2$ 50 grams potassium silicate | 50 grams | weak | 170A |
| 46 | 50 grams colloidal $SiO_2$ 50 grams potassium silicate | 100 grams | very weak | 130A |

As Table V clearly illustrates, increased dilution with water leads to a decrease in pore size. It is conjectured that this phenomenon is the result of this silica polymerization being inhibited by dilution such that particle size and interparticle bonding are reduced. In this manner, decreased particle sizes under maximum packing conditions result in smaller voids between particles. That explanation gains support from data obtained on surface area and compressive strength exhibited by the articles. Thus, the surface area increases with greater dilutions of water, which effect can be correlated to diminishing particle size; whereas the reduced compressive strengths measured at greater dilutions of water can be deemed to be the result of decreased interparticle polymerization.

However, dilution with water does not appear to destroy the capability of securing porous silica-containing bodies where the pore diameters are quite uniform. In reality, dilution can be effectively employed to tailor the pore size to some desired value with, commonly, increased surface area, this latter factor being highly useful in such applications as catalyst supports. The sole caution to be observed is that the mechanical strength of the body is reduced.

In the above examples, formamide comprised the gelation agent. Formamide is the commonly preferred gelation agent for its ease in handling when compared with formaldehyde, paraformaldehyde, glyoxal, methyl acetate, methyl formate, ethyl formate, and ethyl acetate. Nevertheless, those latter compounds can be successfully employed in this invention as is evidenced in the following examples.

The ester gel reagents are normally utilized in compositions containing less than about 50% by weight of the potassium silicate solution with the concomitant presence of more than 50% by weight of the colloidal silica solution due to a decrease in chemical durability displayed by the bodies. It will be apparent, of course, that mixtures of the esters with the other gel reagents could be employed to overcome this durability problem. In mixtures containing very high colloidal silica contents, the esters can comprise the preferred gel reagents since their acidity enables them to react more quickly therewith.

EXAMPLE 47

65 grams of potassium silicate solution were blended slowly with 35 grams of colloidal silica solution in a plastic container at room temperature. Upon obtaining a homogeneous solution, about 25 grams of powdered paraformaldehyde were added thereto with stirring and gentle heating (not in excess of about 90° C.) to induce gelation. The gelled body was removed from the plastic container after about one hour and leached in the aqueous 1M, $NH_4NO_3$ solution described above. A porous body containing uniformly-sized pores averaging about 300Å in diameter was produced exhibiting moderate compressive strength.

EXAMPLE 48

25 grams of potassium silicate solution were blended slowly into 75 grams of colloidal silica in a plastic container at room temperature. When a clear mixed homogeneous solution was secured, about three grams of methyl acetate were added thereto with stirring. The solution was allowed to gel for five minutes at room temperature and the body then removed from the plastic container. After leaching in the aqueous 1M $NH_4NO_3$ solution, a porous body exhibiting moderate compressive strength was obtained wherein the pores were uniformly sized, averaging less than about 200Å in diameter.

In those instances where there is very little alkali silicate in the precursor mixture, small amounts of $NH_4OH$ can advantageously be added to increase the rate of hydrolysis of the ester and, thereby, increase the rate of gelation.

Like mixtures of potassium silicate solution and colloidal silica solution were blended together in plastic containers at room temperature. Upon obtaining a homogenous solution in each, about three grams of methyl formate, ethyl formate, or ethyl acetate were admixed thereto with stirring. After gelling for about 5-10 minutes at room temperature, the bodies were removed from the plastic container and immersed in the aqueous 1M $NH_4NO_3$ solution. In each instance, a porous body demonstrating moderate compressive strength was secured wherein the pores were uniformly sized, averaging less than about 200Å in diameter.

Like mixtures of potassium silicate solution and colloidal silica solution were prepared in plastic containers at room temperature. When a homogeneous solution was obtained in each container, 25 ml. of a commercial formaldehyde solution (37% formaldehyde, balance water) were placed in one container and 25 ml. of a commercial glyoxal solution (30% glyoxal, balance water) were placed in the other. Gelation required about one hour with the formaldehyde with gentle heating and about 5-10 minutes with the glyoxal. After leaching with the aqueous 1M $NH_4NO_3$ solution, a porous body resulted having physical characteristics similar to those observed with the other gelation reagents immediately above.

In sum, the rate of gelation depends upon the rate that the gelling reagent hydrolyzes. Hence, the esters will cause the most rapid gelation of the silica-containing solutions. However, the final properties of the porous bodies will be closely similar irrespective of the gelation agent utilized.

In general, when utilized in identical precursor solutions, the bodies resulting from the use of the organic gel reactants other than formamide demonstrate smaller pores, greater surface areas, and less strength than those produced with formamide as the gelation agent. However, the loss in strength is not as precipitous as is experienced in the dilution with water. Hence, the use of these organic reagents can give control in tailor making bodies for such applications as support materials for catalysts.

This invention also permits the production of porous silica articles of uniformly small-sized pores containing a powder phase dispersed therein. The general method involves dispersing the powders in the precursor silica solution which is then gelled to envelop the dispersed phase within the silica matrix. To achieve good strength while maintaining uniformly small-sized pores, the powdered materials will preferably be finer than a No. 200 United States Standard Sieve (74 microns). Whereas the method is suitable for all particulate materials which are undissolved in and/or unreactive with the precursor solutions, it has been found particularly useful with such materials as alumina, titania, silica, zirconia, carbon, silicon carbide, silicon nitride, and, for anti-pollution devices, the catalytically-active transition metal oxides such as the oxides of vanadium, chromium, iron, cobalt, nickel, manganese, and copper. The following preparative examples are cited as illustrative only and ought not to be deemed limiting.

EXAMPLE 49

90 grams of potassium silicate solution were slowly stirred into 90 grams of colloidal silica solution held in a plastic container at room temperature. When a homogeneous solution was achieved, three grams of a surfactant were added followed by 24.2 grams of colloidal carbon. The surfactant insures wetting of the surface of the carbon particles and aids dispersion thereof. The mixture was then subjected to high shear stirring for five minutes. Thereafter, 15 grams of formamide were added with stirring to avoid particulate formation and the sample allowed to gel at a slightly elevated temperature (25°-100° C.). After removal from the plastic container, the body is freed of excess alkali by immersion in the weakly acid 1M $NH_4NO_3$ solution. A moderately strong, homogeneous silica body containing about 30% by weight carbon was produced with uniformly small-sized pores averaging about 300Å in diameter.

This porous body was thereafter fired at a temperature sufficiently high to burn out or oxidize the colloidal carbon particles but below that at which the silica body will sinter or melt substantially. In general, temperatures greater than about 600° C. and, normally, between about 600°-800° C. were employed. This practice yielded articles exhibiting bimodal porosity, i.e., about 30% of the pores were uniformly sized at an average diameter of about 1500Å with the remainder of the pores being uniformly sized at about 300Å in diameter. It is apparent, of course, that the uniform size of the pores resulting from the burnout was due to the original uniformity of particle size existing in the colloidal carbon filler material.

This technique to achieve two levels of uniform pore size can be conducted with other filler materials which can be oxidized at temperatures lower than the melting temperature of the silica glass. Hence, carbon-containing materials are especially suitable for this purpose. To insure uniformity of porosity and body integrity, the burnout materials will commonly be limited in size to about 1 micron in diameter.

EXAMPLE 50

70 grams of potassium silicate solution were slowly blended into 30 grams of colloidal silica in a plastic container at room temperature. After a homogeneous solution was attained, five grams of a surfactant and 40 grams of calcined alumina powder were added with adequate stirring to promote good dispersion of the particles. About 10 grams of formamide were added with stirring to avoid particulate formation. The mixture was then heated gently to about 40°–45° C. with sufficient stirring to preclude the dispersed phase from settling out. At those temperatures, the solution is viscous enough to resist settling of the dispersed phase so that it can be allowed to gel at temperatures ranging from room temperature up to 100° C. Upon removal of the gelled product from the plastic container, excess alkali can be leached therefrom utilizing the weak acid-alcohol solution.

A moderately strong, homogeneous silica article containing about 60% by weight alumina was formed with uniformly small-sized pores averaging about 950Å in diameter.

EXAMPLE 51

70 grams of potassium silicate solution were slowly added with stirring to 30 grams of colloidal silica solution contained within a plastic vessel at room temperature. Upon achieving a homogeneous solution, 0.15 grams of a surfactant and three grams of colloidal titanium dioxide were blended into the solution with sufficient stirring to achieve good dispersion of the particles. About 10 grams of formamide were added with stirring to prevent particulate formation and the mixture permitted to gel at temperatures ranging from room temperature up to about 100° C. The gelled body was removed from the plastic container and excess alkali removed therefrom through immersion in the aqueous 1M $NH_4NO_3$ solution.

The resulting article, containing about 10% by weight titanium dioxide, was moderately strong, homogeneous, with uniformly small-size pores averaging about 800Å.

EXAMPLE 52

25 grams of potassium silicate solution were slowly added, with stirring, to 75 grams of colloidal silica solution held within a plastic container. Thereafter, four grams of powdered silicon carbide were added to that mixture and stirred sufficiently vigorously to achieve good dispersion and to prevent settling out of the dispersed phase. About three grams of methyl acetate were added, again with rapid stirring, the stirring being maintained until the mixture became viscous enough to inhibit settling out of the solids. Each of the above steps were undertaken at room temperature. The mixture was allowed to stand and gel for about 10 minutes after which the body was removed from the container and excess alkali leached therefrom through immersion in a weakly acidic solution.

The final article contained about 12% by weight SiC homogeneously distributed throughout the body. It exhibited moderate strength and demonstrated uniformly small-size pores averaging somewhat less than 200Å.

EXAMPLE 53

At room temperature, 70 grams of potassium silicate solution were mixed into 30 grams of colloidal silica solution contained within a plastic vessel. Two grams of powdered chromium oxide were added with vigorous stirring to secure good dispersion, whereupon 10 grams of formamide were admixed thereto with continued stirring to prevent settling out of the particles. The mixture was heated gently to 40°–45° C., the stirring being maintained to hold the particles in dispersion. When the mixture became sufficiently viscous to inhibit settling out of the particles, the mixture was allowed to stand and continue gelling at temperatures ranging from room temperature up to 100° C. When no more visible shrinkage was observed, the body was removed from the plastic vessel and excess alkali leached therefrom, utilizing a weakly acidic solution such as aqueous 1M $NH_4NO_3$ solution or a 1–5% 1N $HNO_3$ + 95–99% alcohol solution.

A strong homogeneous silica article containing about 7% by weight $Cr_2O_3$ was obtained with uniformly small-size pores averaging about 700Å in diameter.

EXAMPLE 54

To 20 grams of colloidal silica in a plastic container at room temperature were added 80 grams of potassium silicate solution with stirring. Upon achieving a homogeneous mixture, 10 grams of colloidal silica powder were added with adequate stirring to obtain satisfactory dispersion. Thereafter, about 10 grams of formamide were added with vigorous stirring to avoid localized particulate formation. The mixture was permitted to gel at temperatures ranging from room temperature up to 100° C. When no further shrinkage of the gelled body was observed, the body was removed from the plastic container and excess alkali leached therefrom by immersing into a weakly acidic solution.

A strong homogeneous silica body was obtained wherein about 40% of its composition consisted of a dispersed colloidal silica intimately bonded to the silica of the gel matrix. Uniformly small-size pores averaging about 600Å in diameter were contained therewithin.

EXAMPLE 55

To 75 grams of colloidal silica solution in a plastic vessel at room temperature were added, with stirring, 25 grams of potassium silicate solution. Four grams of powdered silicon nitride were added to that mixture with vigorous stirring to obtain good dispersion of the particles. About three grams of methyl acetate were admixed, with continued rapid stirring, until the mixture became sufficiently viscous to prevent the settling out of the solids. The mixture was then allowed to stand and gel for about 10 minutes at room temperature, following which the body was taken out of the plastic container and the excess alkali leached therefrom utilizing the weakly acidic 1M $NH_4NO_3$ solution.

The resulting article contained about 12% by weight $Si_3N_4$ homogeneously dispersed throughout the body.

The body demonstrated moderate strength with uniformly small-size pores averaging less than 200Å.

In general, additions of the dispersed phase can alter the pore size and/or the strength of the body. In view of this factor, a total of about 70% by weight of dispersed additive has been deemed a practical maximum. The size of the dispersed particles has a bearing upon the amount that can be added while retaining the desired strength and uniform pore size. Higher loadings of larger sized particles can be utilized than those of colloidal size.

To better illustrate the differences existing between U.S. Pat. No. 3,678,144, Examples 56–62 were undertaken. This work was conducted to demonstrate that the metal salt additions disclosed in that patent, such as $K_2MoO_4$, $K_2HPO_4$, and $K_2CrO_4$, are not merely fillers which can be leached out of the product but, rather, react with the other components to become an integral part of the final product and, in so doing, alter the pore size and pore size distribution in the final product.

FIGS. 1–7 represent porosimetry curves drawn by the above-described porosimetry apparatus for Examples 56–62, inclusive, to graphically illustrate the differences in pore size and pore size distribution in the final product of those Examples.

EXAMPLE 56

To 100 grams of an aqueous potassium silicate solution consisting, by weight, of approximately 8.3% $K_2O$, 20.8% $SiO_2$, and the remainder $H_2O$, was admixed a solution composed of 5 grams formamide and 1 gram KOH in 25 grams $H_2O$. The combined solution was left in a plastic vessel to gel at room temperature (20°–25° C.) for about 16 hours and then heated to about 70° C. where it was held for 2 hours. After cooling to about room temperature, the gelled body was removed from the vessel and thereafter immersed into an aqueous solution of about 0.5M $NH_4NO_3$ at a temperature of 80° C. After several changes of fresh 0.5M $NH_4NO_3$ solution, the sample was transferred to an aqueous 50% by volume HCl solution and heated to about 80° C. Finally, the sample was immersed into distilled $H_2O$ to remove excess residual acid before being air dried and heated to 300° C.

FIG. 1 graphically records the results of the porosimetry measurements utilizing the above-described porosimeter. As can be observed, the curve demonstrates that a typical silica body produced solely from an aqueous solution of potassium silicate yields a body with a mean pore diameter of about 4000Å.

EXAMPLE 57

To 100 grams of the potassium silicate solution employed in Example 56 was admixed a solution composed of 5.4 grams $K_2MoO_4$ and 0.5 gram KOH in 10 grams $H_2O$. Thereafter, 10 grams formamide were added with stirring. The combined solution was poured into a plastic container to gel at room temperature for 16 hours and then heated to about 70° C. where it was held for two hours. The gelled body was removed from the container and subjected to the leaching practice described in Example 56. The leached body was subsequently air dried, heated to 300° C., and then subjected to a porosity determination.

Figure 2:
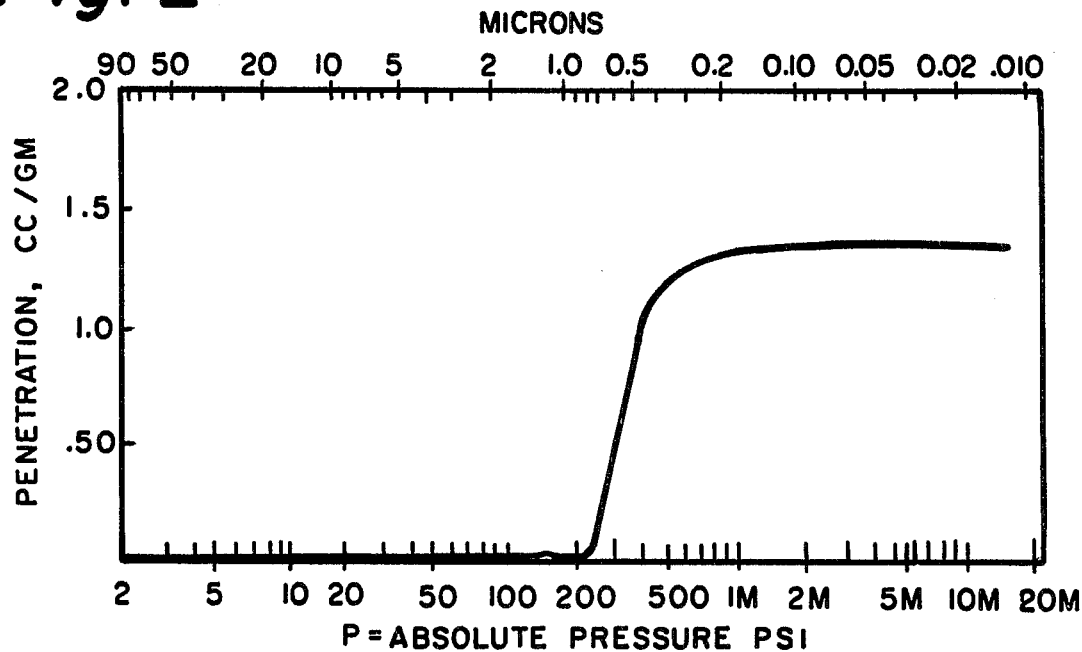

FIG. 2 depicts the porosity curve traced for this leached body. It is quite apparent that the inclusion of $K_2MoO_4$ in the composition resulted in a substantial shift in mean pore diameter with respect to Example 56. Thus, the mean pore diameter exhibited by this leached body is about 6000Å, as compared with 4000Å in Example 56.

EXAMPLE 58

To 100 grams of the potassium silicate solution used in Example 56 was admixed a solution composed of 5.4 grams $K_2HPO_4$ and 1 gram KOH in 10 grams $H_2O$. Thereafter, 10 grams formamide were added to the solution with stirring. The gelling, leaching, and drying operations were conducted in like manner to those described in Example 56.

Figure 3:
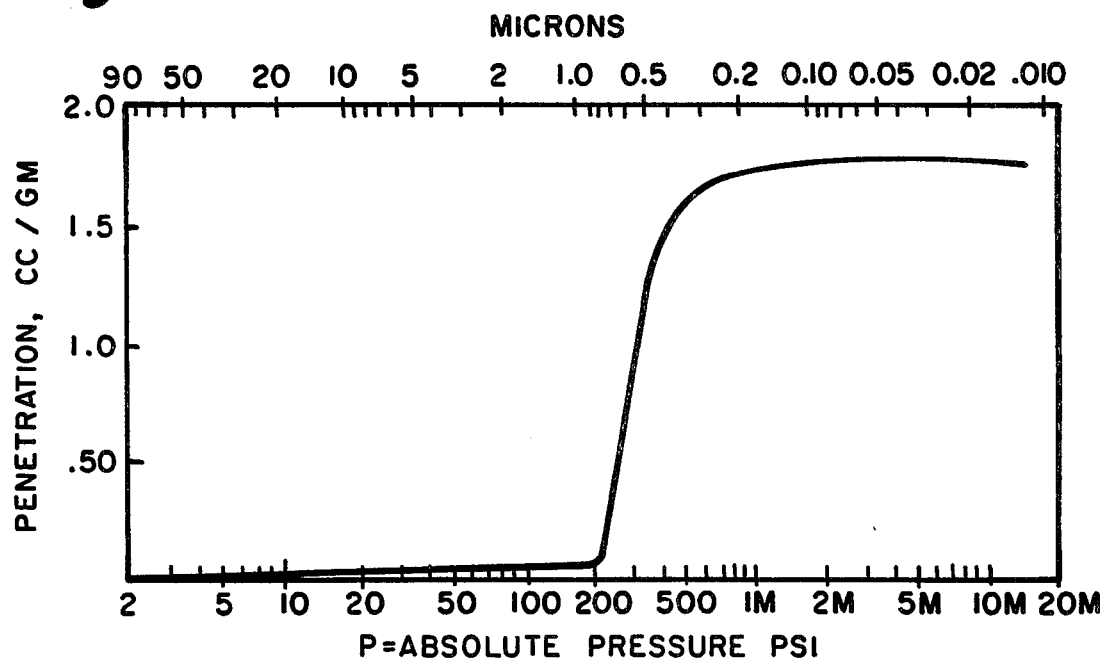

FIG. 3 represents the porosity curve obtained from the final leached body. This curve illustrates that the presence of the $K_2HPO_4$ salt as a starting ingredient caused an abrupt shift in mean pore diameter. Thus, like Example 57, this leached body demonstrated a mean pore diameter of about 6000Å.

EXAMPLE 59

To 100 grams of the potassium silicate solution employed in Example 56 was admixed a solution composed of 13 grams of $K_2CrO_4$, 1 gram KOH, and 10 grams formamide in 25 grams $H_2O$. The gelling, leaching, and drying steps were undertaken in like manner to those described in Example 56.

Figure 4:
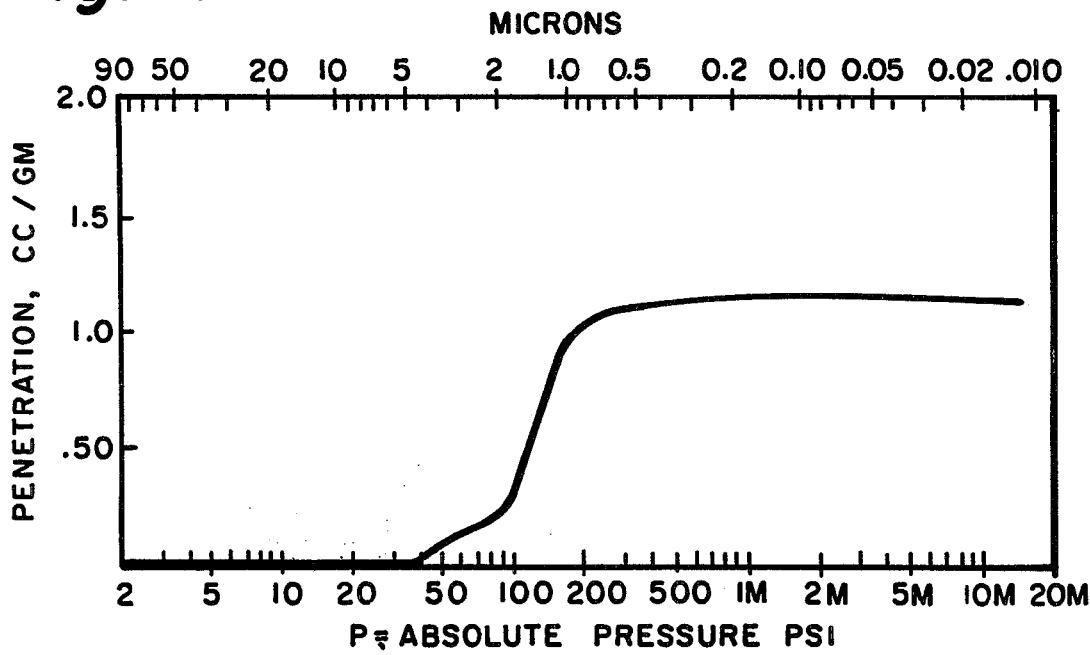

FIG. 4 presents the porosity curve drawn from the leached body. The curve makes obvious that the inclusion of $K_2CrO_4$ also resulted in a dramatic shift in mean pore diameter when compared with Example 56. Thus, the mean pore diameter exhibited by this body was 16000Å (1.6 microns), as compared with 4000Å in Example 56.

To demonstrate that this variation in pore diameter is not limited to gels wherein potassium silicate constitutes the sole silica-containing component, the following laboratory work was conducted.

EXAMPLE 60

To 50 grams of the potassium silicate solution utilized in Example 56 were admixed slowly 50 grams of aqueous colloidal silica consisting essentially, by weight, of about 40% $SiO_2$ and the remainder $H_2O$. About 5 grams formamide were added to the combined solution with stirring. The gelling, leaching, and drying operations were performed in like manner to those of Example 56 and porosimetry measurements were determined.

Figure 5:
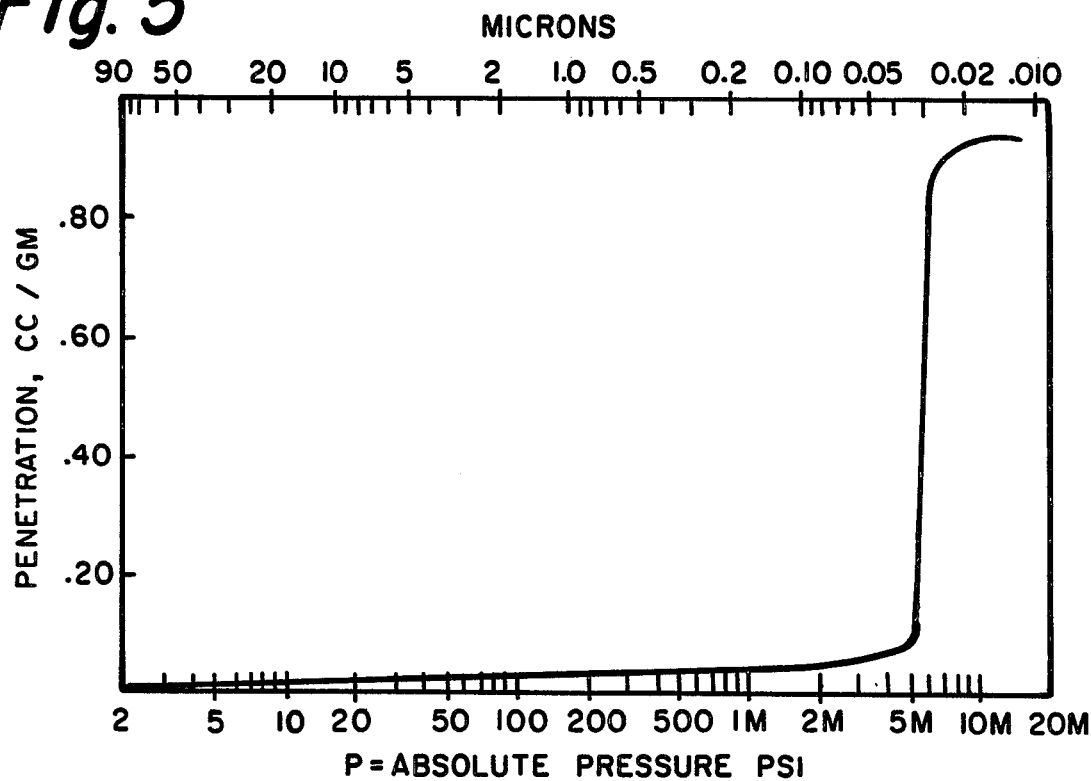

FIG. 5 depicts the porosity curve traced from the leached body which indicates a mean pore diameter of about 310Å with an extremely narrow distribution in the pore sizes.

Example 60 is representative of the desired products of the present invention.

EXAMPLE 61

To a solution consisting of 50 grams of potassium silicate solution plus 50 grams of colloidal silica described in Example 60 was admixed a solution composed of 5.7 grams $K_2CrO_4$, 1 gram KOH, 5 grams formamide, and 10 grams $H_2O$. The gelling, leaching, and drying practices were conducted in like manner to those of Example 56.

Figure 6:
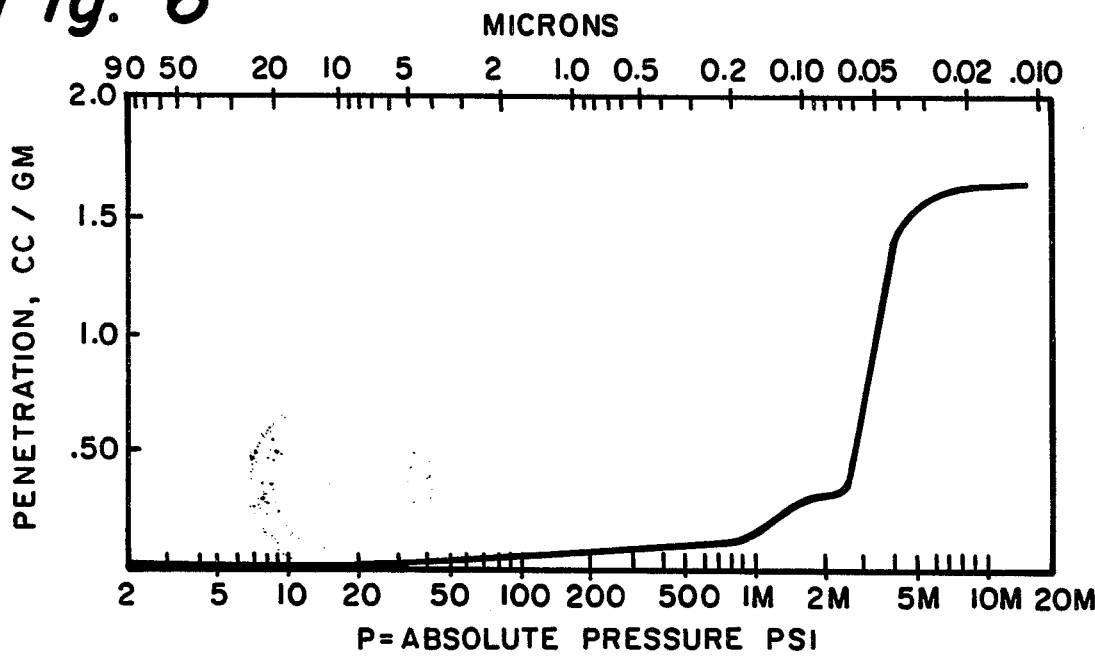

FIG. 6 sets forth the porosity curve of the leached body. The curve clearly illustrates a shift in mean pore diameter (about 525Å) with a very significant broadening in the distribution of pore sizes.

EXAMPLE 62

To a solution consisting of 30 grams of potassium silicate solution plus 30 grams of colloidal silica described in Example 60 was admixed a solution containing 5.7 grams $K_2CrO_4$ and 1 gram KOH in 10 grams $H_2O$. Finally, about 25 grams paraformaldehyde powder were added with stirring. Gentle heat was applied to aid in dissolving the powder in the solution. After most of the powder appeared to have dissolved, the vessel containing the sample was transferred to an oven operating at 50° C., maintained at that temperature for 2 hours to complete gelation, heated to 70° C., and held at that temperature for 2 hours. The sample was removed from the container, leached, and dried in accordance with the techniques described in Example 56.

Figure 7:
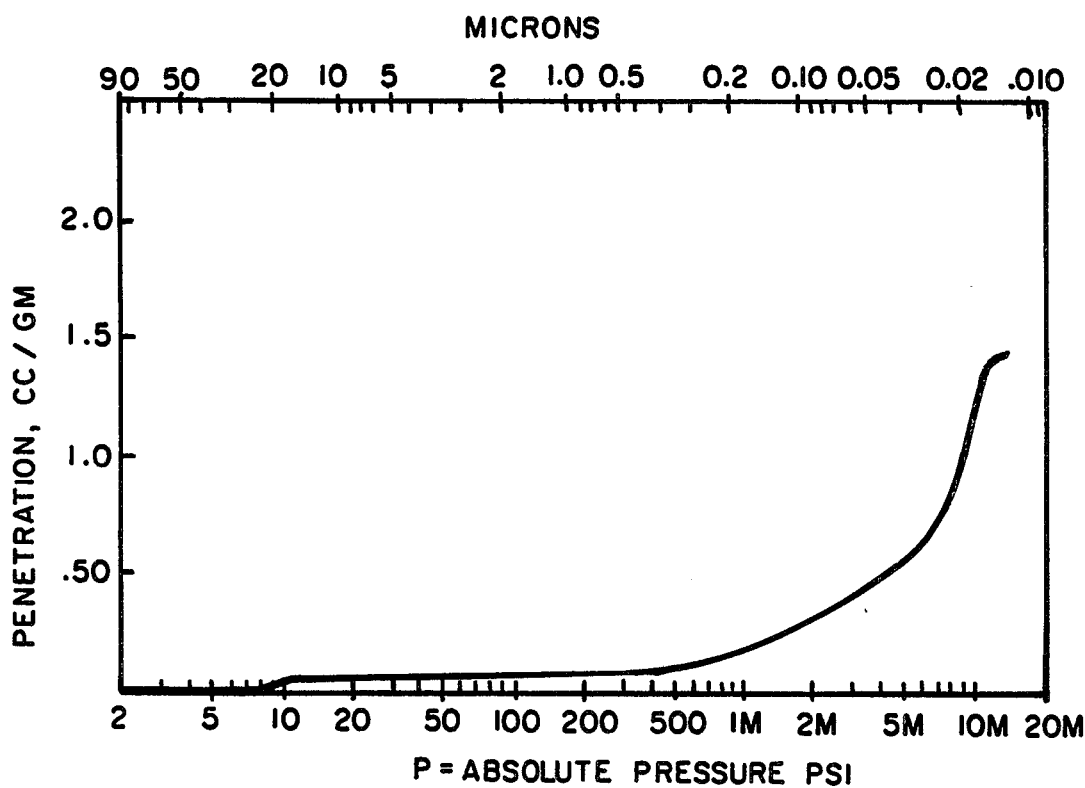

FIG. 7 delineates the porosity curve obtained for the leached body. The curve unquestionably shows the very broad pore size distribution intrinsic to the sample with a mean pore diameter of about 250Å.

A comparison of the porosity curves of Examples 57–59 with Example 56 and 61–62 with Example 60 clearly shows (a) that the addition of metal oxides to the alkali metal silicate-gelation agent mixtures not only shifts the sizes of the pores present in the leached body but also broadens the pore size distribution, and (b) that one could not predict from U.S. Pat. No. 3,678,144 that bodies of very closely defined pore sizes and distribution could be achieved with compositions within the present inventive ranges.

A comparison of the porosity curve of Example 56 with that of Example 60 evidences that the pore size distribution inherent to Example 56 is broader than that of Example 60.

Therefore, the metal oxide additions disclosed in U.S. Pat. No. 3,678,144 are not simply fillers, but are reactants which become an integral part of the final product and substantively affect the porosity thereof; and, further, a body made from potassium silicate solution alone does not exhibit the desired narrow distribution of pore sizes of the present invention.

We claim:

1. A method for making porous silica-containing articles exhibiting compressive strengths in the pristine state greater than about 50 psi, having pore diameters ranging between about 100Å–1 micron, wherein at least 80% of the pores therein fall within ±30% of the average pore diameter value, which consists of
   (a) preparing solutions having a pH between 10–15 and containing about 1–12 moles $SiO_2$/liter in solution from silicate solutions selected from the group consisting of lithium polysilicate, sodium silicate, potassium silicate, quaternary ammonium silicate, and colloidal silica;
   (b) combining those solutions in one of the indicated proper proportions equivalent to:
   (A) a weight ratio of 19:1 to 1:4 potassium silicate solution to colloidal silica solution wherein said potassium silicate solution consists essentially of 8.3% $K_2O$, 20.8% $SiO_2$, balance $H_2O$ and said colloidal silica solution consists essentially of 40% $SiO_2$, balance $H_2O$;
   (B) a weight ratio of 1:9 to 1:3 sodium silicate solution to colloidal silica solution wherein said sodium silicate solution consists essentially of 6.8% $Na_2O$, 25.3% $SiO_2$, balance $H_2O$ and the colloidal silica solution is that defined in (A);
   (C) a weight ratio of 9:1 to 1:4 potassium silicate solution and/or sodium silicate solution to quaternary ammonium silicate solution wherein said potassium silicate solution is that defined in (A), said sodium silicate solution is that defined in (B), and said quaternary ammonium silicate solution consists essentially of 9.9% quaternary ammonium ions, 45% $SiO_2$, balance $H_2O$;
   (D) a weight ratio of 19:1 to 1:4 potassium silicate solution and/or sodium silicate solution to lithium polysilicate solution wherein said potassium silicate solution is that defined in (A), said sodium silicate solution is that defined in (B), and said lithium polysilicate solution consists essentially of 2.1% $Li_2O$, 20% $SiO_2$, balance $H_2O$;
   (c) reacting an organic compound therewith selected from the group consisting of formaldehyde, paraformaldehyde, formamide, glyoxal, methyl formate, ethyl formate, methyl acetate, ethyl acetate, and mixtures thereof at a temperature between the freezing point and the boiling point of the solution for a sufficient period of time to polymerize the silica into a coherent, porous gelled body; and
   (d) leaching said gelled body with a weak acid solution to remove excess alkali metal oxide.

2. A method according to claim 1 wherein up to 70% by weight of particulate materials passing a No. 200 United States Standard Sieve which are undissolved in and/or unreactive with said silicate solution and/or said organic compounds are admixed with said silicate solutions.

3. A method according to claim 2 wherein said particulate materials are selected from the group consisting of alumina, titania, silica, zirconia, carbon, silicon carbide, silicon nitride, iron oxides, and catalytically active transition metal oxides.

4. A method according to claim 2 wherein said particulate materials are of colloidal size.

5. A method for making silica-containing articles of bimodal porosity exhibiting compressive strengths in the pristine state greater than about 50 psi, having pore diameters ranging between about 100Å–1 micron, and wherein at least 80% of the pores in each level of porosity fall within ±30% of the average pore diameter of that level, which consists of
   (a) preparing solutions having a pH between 10–15 and containing about 1–12 moles $SiO_2$/liter in solution from silicate solutions selected from the group consisting of lithium polysilicate, sodium silicate, potassium silicate, quaternary ammonium silicate, and colloidal silica;
   (b) combining those solutions in one of the indicated proper proportions equivalent to:
   (A) a weight ratio of 19:1 to 1:4 potassium silicate solution to colloidal silica solution wherein said potassium silicate solution consists essentially of 8.3% $K_2O$, 20.8% $SiO_2$, balance $H_2O$ and said colloidal silica solution consists essentially of 40% $SiO_2$, balance $H_2O$;
   (B) a weight ratio of 1:9 to 1:3 sodium silicate solution to colloidal silica solution wherein said sodium silicate solution consists essentially of 6.8% $Na_2O$, 25.3% $SiO_2$, balance $H_2O$ and the colloidal silica solution is that defined in (A);
   (C) a weight ratio of 9:1 to 1:4 potassium silicate solution and/or sodium silicate solution to quaternary ammonium silicate solution wherein said potassium silicate solution is that defined in (A), said sodium silicate solution is that defined in (B), and said quaternary ammonium silicate solution consists essentially of 9.9% quaternary ammonium ions, 45% $SiO_2$, balance $H_2O$;

(D) a weight ratio of 19:1 to 1:4 potassium silicate solution and/or sodium silicate solution to lithium polysilicate solution wherein said potassium silicate solution is that defined in (A), said sodium silicate solution is that defined in (B), and said lithium polysilicate solution consists essentially of 2.1% $Li_2O$, 20% $SiO_2$, balance $H_2O$;

(c) admixing up to 70% by weight of particulate materials of uniform size having a diameter less than about 1 micron, which can be burned out at a temperature below that at which the silica body will sinter or melt substantially, and which are undissolved in and/or unreactive with said silicate solutions and/or organic compounds recited in (d) below;

(d) reacting an organic compound therewith selected from the group consisting of formaldehyde, paraformaldehyde, formamide, glyoxal, methyl formate, ethyl formate, methyl acetate, ethyl acetate, and mixtures thereof at a temperature between the freezing point and the boiling point of the solution for a sufficient period of time to polymerize the silica into a coherent, porous gelled body;

(e) leaching said gelled body with a weak acid solution to remove excess alkali metal oxides; and (f) firing said leached body at a temperature sufficiently high to burn out said particulate materials but below the sintering or melting temperature of the silica body.

6. A method according to claim 5 wherein said particulate materials are carbon-containing materials.

7. A method according to claim 6 wherein said carbon-containing material is colloidal carbon.

8. A method according to claim 5 wherein said firing temperature ranges between about 600°–800° C.

* * * * *

UNITED STATES PATENT AND TRADEMARK OFFICE
CERTIFICATE OF CORRECTION

PATENT NO. : 4,112,032
DATED : September 5, 1978
INVENTOR(S) : Paul E. Blaszyk, Robert D. Shoup, William J. Wein It is certified that error appears in the above-identified patent and that said Letters Patent are hereby corrected as shown below:

Column 8, Table V, between lines 26 and 27 insert -- 50 grams potassium sili- --.

Column 6, line 47, "1:19" should be -- 1:9 --.

Signed and Sealed this

Tenth Day of July 1979

[SEAL]

Attest:

Attesting Officer

LUTRELLE F. PARKER
Acting Commissioner of Patents and Trademarks